United States Patent
Liu et al.

(10) Patent No.: US 11,159,373 B2
(45) Date of Patent: Oct. 26, 2021

(54) CHANNEL RECONFIGURATION IN A COMMUNICATIONS NETWORK BASED ON MEASUREMENTS BY WIRELESS DEVICES AND NETWORK NODE

(71) Applicant: Telefonaktiebolaget LM Ericsson (publ), Stockholm (SE)

(72) Inventors: Junying Liu, Lund (SE); Mats Buchmayer, Enskede Gard (SE); Fredric Kronestedt, Bromma (SE); Emma Wittenmark, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 16/607,808

(22) PCT Filed: Apr. 28, 2017

(86) PCT No.: PCT/EP2017/060187
§ 371 (c)(1),
(2) Date: Oct. 24, 2019

(87) PCT Pub. No.: WO2018/196995
PCT Pub. Date: Nov. 1, 2018

(65) Prior Publication Data
US 2020/0059405 A1 Feb. 20, 2020

(51) Int. Cl.
*H04W 16/14* (2009.01)
*H04W 72/04* (2009.01)
(Continued)

(52) U.S. Cl.
CPC ....... *H04L 41/0816* (2013.01); *H04B 17/318* (2015.01); *H04W 16/14* (2013.01); *H04W 68/005* (2013.01); *H04W 72/0453* (2013.01)

(58) Field of Classification Search
CPC .. H04L 41/0816; H04B 17/318; H04W 16/14; H04W 68/005; H04W 72/0453; H04W 24/10
See application file for complete search history.

(56) References Cited

U.S. PATENT DOCUMENTS

| | | | | |
|---|---|---|---|---|
| 6,456,847 B1 * | 9/2002 | Lilja | ..................... | H04W 36/06 455/437 |
| 10,440,643 B2 * | 10/2019 | Feng | ................. | H04W 72/0453 |

(Continued)

FOREIGN PATENT DOCUMENTS

WO 2017065852 A1 4/2017

*Primary Examiner* — Mohamed A Kamara
(74) *Attorney, Agent, or Firm* — Murphy, Bilak & Homiller, PLLC

(57) ABSTRACT

Mechanisms are provided for channel reconfiguration in a communications network where shared spectrum from a primary incumbent is used. A method is performed by a network node, which comprises obtaining RSSI measurements on the current channel from wireless devices. The wireless devices are served by the network node at a current channel in a current frequency interval within a frequency band. When the RSSI measurements trigger a need for the network node to perform channel reconfiguration, the network node selects a new channel based on RSSI measurements that it itself performs. The method comprises selecting a new channel in a new or the same frequency interval, in a new or the same frequency band, for serving the wireless devices based on RSSI measurements performed by the network node, and channel reconfiguration for the wireless devices is performed.

22 Claims, 6 Drawing Sheets

(51) Int. Cl.
*H04L 12/24* (2006.01)
*H04B 17/318* (2015.01)
*H04W 68/00* (2009.01)

(56) References Cited

U.S. PATENT DOCUMENTS

| | | | |
|---|---|---|---|
| 2009/0074033 | A1 | 3/2009 | Kattwinkel |
| 2009/0080382 | A1* | 3/2009 | Chen ................ H04W 36/0016 370/331 |
| 2013/0165134 | A1 | 6/2013 | Touag et al. |
| 2017/0295578 | A1* | 10/2017 | Khoshnevisan .... H04W 72/082 |
| 2018/0132288 | A1* | 5/2018 | Aguirre ................ H04L 5/0091 |
| 2019/0342061 | A1* | 11/2019 | Kim .................. H04W 72/0473 |

* cited by examiner

CHANNEL RECONFIGURATION IN A COMMUNICATIONS NETWORK BASED ON MEASUREMENTS BY WIRELESS DEVICES AND NETWORK NODE

TECHNICAL FIELD

Embodiments presented herein relate to a method, a network node, a computer program, and a computer program product for channel reconfiguration in a communications network.

BACKGROUND

In communications networks, there may be a challenge to obtain good performance and capacity for a given communications protocol, its parameters and the physical environment in which the communications network is deployed.

Current practices for wireless mobile communications have focused on designing systems for wide area coverage in frequency bands that roughly extend between 400 MHz to 100 GHz, although there is no physical limitation that strictly limits such systems to that range. The traffic growth on mobile networks has grown to the point where the mobile industry is consistently starved for spectrum.

Every generation of wireless technology has improved the metrics underlying spectrum efficiency, typically measured as area efficiency and denominated in the ratio data rate supported per unit bandwidth per cell ((b/s)/Hz/cell).

A memorandum has resulted in regulations from the Federal Communications Commission (FCC) relating to the so-called Citizen's Broadband Radio Service (CBRS) defined for the 3550-3700 MHz band. The CBRS defines three tiers of sharing, with higher tiers providing higher priority of access to spectrum than the lower ones. In general, multiple tiers of users can be defined, although three tiers are a pragmatic choice. The assignment of channels to different tiers and related configurations are performed by a geolocation database and policy management system known as the Spectrum Access System (SAS). In the CBRS, naval radar in littoral waters, and commercial Fixed Satellite Service (FSS) compose the incumbents. The second tier consists of Priority Access Licenses (PALs), and the third tier comprises opportunistic users known as general authorized access (GAA) users. Incumbent radar activity in the CBRS is dynamic, while FSS (space-to-earth) is static. The SAS is charged with protecting incumbents, and PALs. In addition, the SAS authorizes the authorization of spectrum to GAA users.

FIG. 1 schematically illustrates a part of a communications network. In more detail, FIG. 1 schematically illustrates elements of an example SAS functional architecture. In some aspects the SAS functional architecture is part of a core network 120. A first SAS (denoted SAS 1) is operatively connected to FCC databases, another SAS (denoted SAS 2), an Environmental Sensing Capability (ESC), an Informing Incumbent function, a Domain Proxy and a Citizens Broadband Radio Service Device (CBSD) (denoted CBSD 4). The Domain Proxy is in turn operatively connected (optionally via an Element Management System (EMS)) with CBSDs (denoted CBSD 1, CBSD 2, CBSD 3), and an optional CBSD sensing function.

Accessing spectrum around 3.5 GHz (the so-called CBRS band) is performed following standards defined in WinnForum. A CBSD will first register with the SAS and provide its location information among other registration parameters, and then it will ask the SAS to grant access in a certain channel. Before granting access, the SAS will use information from the ESC network to detect incumbent activity in the area where CBSD operates. The SAS will also use measurement reports from the other CBSDs in the same area to determine the level of interference in a certain channel as well as if the channel needs to be protected due to PAL user activity. A coexistence management (CXM) function or the Domain Proxy has the possibility to select which channel the CBSD is to use, and the SAS has the responsibility to ensure interference protection according to the rules set out in FCC part 96. In relation to FIG. 1 the CXM function could be collocated with the Domain Proxy, with a Domain Manager, or with any of the SASs, or with another entity, or be provided as a separate entity; the CXM could generally be regarded as a separate logical entity that manages co-existence between GAA devices operating in Long Term Evolution Time Division Duplex (LTE-TDD) mode.

However, there is still a need for achieving improved spectral efficiency in communications networks.

SUMMARY

An object of embodiments herein is to provide efficient channel selection in a communications network.

According to a first aspect there is presented a method for channel reconfiguration in a communications network. The method is performed by a network node. The method comprises obtaining RSSI measurements from wireless devices. The wireless devices are served by the network node at a current channel in a current frequency interval within a frequency band. The RSSI measurements trigger a need for the network node to perform channel reconfiguration. The method comprises selecting a new channel in a new or the same frequency interval, in a new or the same frequency band, for serving the wireless devices based on RSSI measurements performed by the network node, thereby performing the channel reconfiguration.

According to a second aspect there is presented a network node for channel reconfiguration in a communications network. The network node comprises processing circuitry. The processing circuitry is configured to cause the network node to obtain RSSI measurements from wireless devices. The wireless devices are served by the network node at a current channel in a current frequency interval within a frequency band. The RSSI measurements trigger a need for the network node to perform channel reconfiguration. The processing circuitry is configured to cause the network node to select a new channel in a new or the same frequency interval, in a new or the same frequency band, for serving the wireless devices based on RSSI measurements performed by the network node, thereby performing the channel reconfiguration.

According to a third aspect there is presented a network node for channel reconfiguration in a communications network. The network node comprises processing circuitry and a storage medium. The storage medium stores instructions that, when executed by the processing circuitry, cause the network node to perform operations, or steps. The operations, or steps, cause the network node to obtain RSSI measurements from wireless devices. The wireless devices are served by the network node at a current channel in a current frequency interval within a frequency band. The RSSI measurements trigger a need for the network node to perform channel reconfiguration. The operations, or steps, cause the network node to select a new channel in a new or the same frequency interval, in a new or the same frequency band, for serving the wireless devices based on RSSI measurements performed by the network node, thereby performing the channel reconfiguration.

According to a fourth aspect there is presented a network node for channel reconfiguration in a communications network. The network node comprises an obtain module configured to obtain RSSI measurements from wireless devices. The wireless devices are served by the network node at a current channel in a current frequency interval within a frequency band. The RSSI measurements trigger a need for the network node to perform channel reconfiguration. The network node comprises a select module configured to select a new channel in a new or the same frequency interval, in a new or the same frequency band, for serving the wireless devices based on RSSI measurements performed by the network node, thereby performing the channel reconfiguration.

According to a fifth aspect there is presented a computer program for channel reconfiguration in a communications network, the computer program comprising computer program code which, when run on a network node, causes the network node to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these network nodes, this computer program, and this computer program product provide efficient channel selection in the communications network.

Advantageously this method, these network nodes, this computer program, and this computer program product improve the reliability of frequency selection in a network node with consideration of both uplink and downlink interference level, without requiring a change of any interfaces as standardized by the 3rd Generation Partnership Project (3GPP).

It is to be noted that any feature of the first, second, third, fourth, fifth and sixth aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
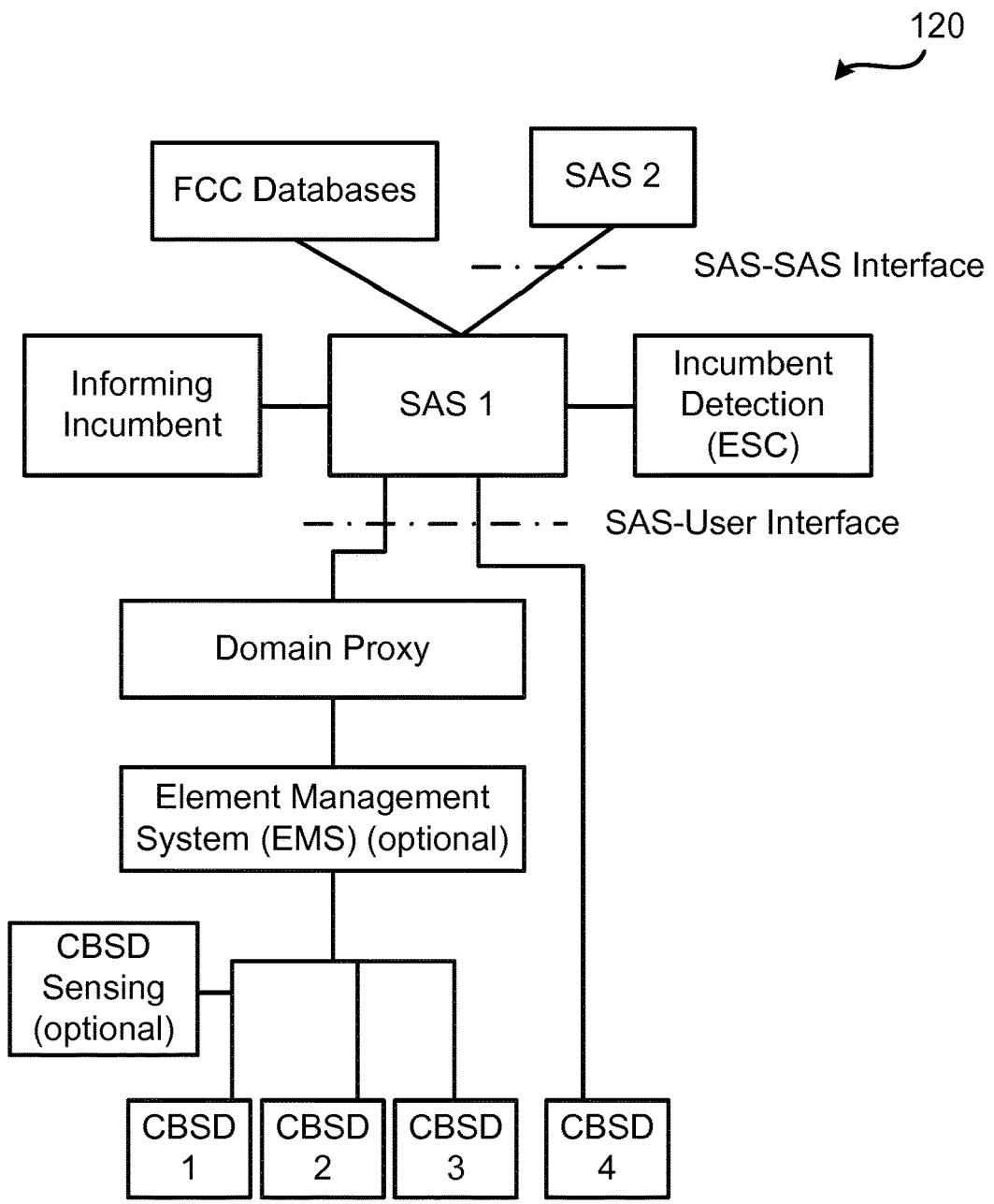
FIG. 1 is a schematic diagram illustrating a part of a communications network.
Figure 2:
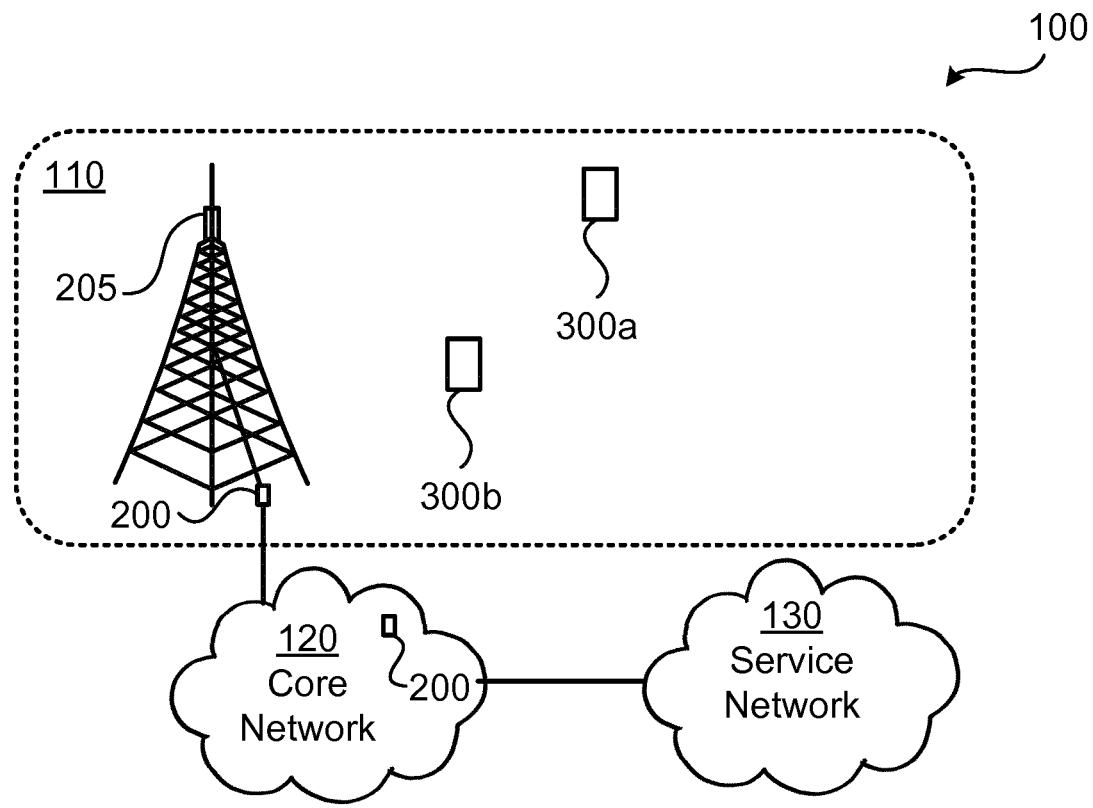
FIG. 2 is a schematic diagram illustrating a communications network according to embodiments.

FIG. 2 is a schematic diagram illustrating a radio communications network 100 where embodiments presented herein can be applied. The communications network 100 comprises a radio access network 110, a core network 120, and a service network 130. The radio access network 110 comprises a network node 200 that is configured to, via a transmission and reception point (TRP) 205, communicate with wireless devices 300a, 300b. The wireless devices 300a, 300b are thereby enabled to access services and exchange data with the service network 130. The core network 120 could comprise the elements of the SAS functional architecture given in FIG. 1.

Examples of network nodes 200 are CBSDs, radio base stations, base transceiver stations, Node Bs, evolved Node Bs, gigabit Node Bs, access points, and access nodes. Examples of wireless devices 300a, 300b are mobile stations, mobile phones, handsets, wireless local loop phones, user equipment (UE), smartphones, laptop computers, tablet computers, network equipped sensors, network equipped vehicles, and so-called Internet of Things devices. In some aspects at least one of the wireless devices 300a, 300b is a wireless device with high UE category, for example category 6 or higher.

The embodiments disclosed herein relate to mechanisms for channel reconfiguration in a communications network 100. In order to obtain such mechanisms there is provided a network node 200, a method performed by the network node 200, a computer program product comprising code, for example in the form of a computer program, that when run on a network node 200, causes the network node 200 to perform the method.

The inventors of the enclosed embodiments have realized that in an operating communications network, the network node and wireless devices served by the network node have different interfering sources. The reliability of the channel selection might therefore be improved if considering received signal strength indicator (RSSI) measurements performed both by the served wireless devices and the network node. However, it is still unknown how to use RSSI measurements from wireless devices and how to combine them with RSSI measurements from the network node during channel selection.

The inventors of the enclosed embodiments have further realized that in order to provide reliable services in the communications network, the selected channel assignment should be continuously monitored in order for the network node to detect new interference sources that could appear when e.g. new network nodes are deployed in the surroundings or if locations of the wireless devices served by the network node change significantly during the day or weekend. As locations of wireless devices and radio propagation characteristics are difficult to predict, using measurements from the wireless devices might me more accurate than measurements of the network node.

Figure 3:
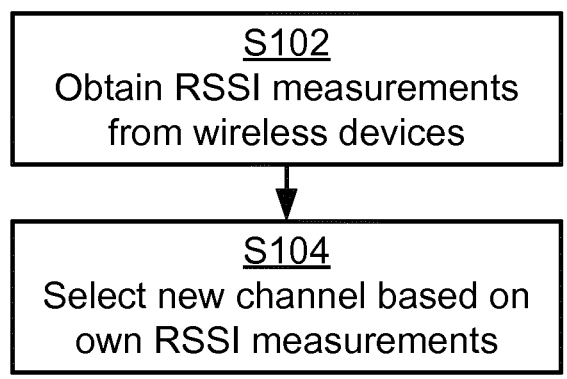
FIGS. 3, 5, and 6 are flowcharts of methods according to embodiments.
Figure 5:
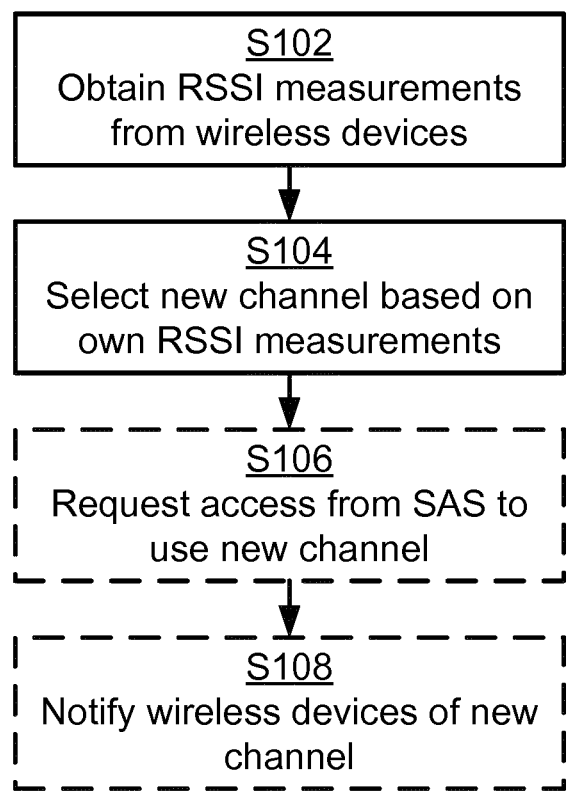

FIGS. 3 and 5 are flowcharts illustrating embodiments of methods for channel reconfiguration in a communications network 100. The methods are performed by the network node 200. The methods are advantageously provided as computer programs 920.

Reference is now made to FIG. 3 illustrating a method for channel reconfiguration in a communications network 100 as performed by the network node 200 according to an embodiment.

The network node 200 will use RSSI measurements reported periodically from served wireless devices 300a, 300b to trim and trigger channel reconfiguration. The network node 200 will collect RSSI measurements for all served wireless devices 300a, 300b over one or several measurement periods. Hence, the network node 200 is configured to perform step S102:

S102: The network node 200 obtains RSSI measurements from wireless devices 300a, 300b. The wireless devices 300a, 300b are served by the network node 200 at a current channel. The current channel is located in a current frequency interval. The current frequency interval is, in turn, located within a frequency band. The RSSI measurements trigger a need for the network node 200 to perform channel reconfiguration.

That is, the RSSI measurements as performed by the wireless devices 300a, 300b trigger the network node 200 to perform channel reconfiguration. During the channel reconfiguration the network node 200 utilizes its own RSSI measurements. Hence, the network node 200 is configured to perform step S104:

S104: The network node 200 selects a new channel in a new or the same frequency interval, in a new or the same frequency band. The new channel is selected for serving the wireless devices 300a, 300b. The selection of the new channel is based on RSSI measurements performed by the network node 200. The network node 200 thereby performs the channel reconfiguration.

Embodiments relating to further details of channel reconfiguration in a communications network 100 as performed by the network node 200 will now be disclosed.

Assume that the current channel is located at a current frequency. According to an embodiment the RSSI measurements from the wireless devices 300a, 300b comprise RSSI measurements performed at the current frequency as well as at at least one further frequency. The at least one further frequency is located at a frequency offset to the current frequency (or even to the current frequency interval). The at least one further frequency could therefore be denoted a neighbour frequency. As an example, the frequency offset could be selected to have a value in the range [2.5+BW, 5+BW] MHz, where BW is the occupied bandwidth of the current frequency interval.

As an example, after the wireless devices 300a, 300b successfully camp on the network node 200 (or on cell in which the network node 200 provides network access), the network node 200 could instruct the wireless devices 300a, 300b to perform RSSI measurements on one or more neighbor frequencies for inter-frequency RSSI measurement. Such instructions could be provided from the network node 200 to the wireless devices 300a, 300b in an information element denoted MeasConfig.

That is, the at least one further frequency is located outside the current frequency interval. The RSSI measurements thereby represent measurements performed both inside the current frequency interval and outside the current frequency interval. It could thereby be possible for the network node 200 to check how many wireless devices 300a, 300b that have strong interference from one or more neighbor frequencies.

The channel reconfiguration could then be triggered when the RSSI measurements performed at the at least one further frequency indicate high interference.

According to an embodiment the channel reconfiguration is triggered when a difference between the RSSI measurements performed at the current frequency and the RSSI measurements performed at the at least one further frequency is smaller than a threshold value for at least a portion of the wireless devices 300a, 300b. That is, when the network node 200 receives the RSSI measurements from the wireless devices 300a, 300b, the network node 200 might check how many wireless devices 300a, 300b have strong interference at the at least one further frequency. Denote by RSSI(fc) the RSSI measurement at the current frequency and by RSSI(f1) the RSSI measurement at one of the at least one further frequency. Then, if RSSI(fc)−RSSI(f1)<Threshold1, there is strong interference from frequency f1, and so on for all remaining neighbour frequencies (i.e., for all remaining ones of the at least one further frequency). In other words, in an ideal situation the RSSI measurements performed by the wireless devices 300a, 300b within the current frequency interval (such as at at the current frequency) are much higher than the RSSI measurements performed by the wireless devices 300a, 300b outside the current frequency interval (such as at the one or more neighbour frequencies). If this is not the case it could be beneficial to re-locate the current channel to a new channel.

In some aspects the channel reconfiguration is triggered when there are more than a first certain portion (for example, 20%) of all served wireless devices 300a, 300b or some second certain portion (for example, 10%) of wireless devices 300a with high UE category that have strong interference from one or more neighbor frequencies. That is, according to an embodiment the channel reconfiguration is triggered when the RSSI measurements from at least a portion (i.e., the above mentioned first certain portion) of all wireless devices 300a, 300b from which RSSI measurements are received indicate high interference. And, according to an embodiment the channel reconfiguration is triggered when the RSSI measurements from at least a portion (i.e., the above mentioned second certain portion) of wireless devices 300a with high UE category from which RSSI measurements are received indicate high interference.

In general terms, any channel as mentioned herein is located at a certain frequency. The term channel as used herein could therefore, unless otherwise stated, be denoted as a frequency channel.

In particular, according to an embodiment the current channel is located at a current frequency centered in the current frequency interval and the new channel is located at a new frequency centered in the new frequency interval. The new frequency interval could be selected such that the new frequency is located outside the current frequency interval.

In other aspects the new channel is located in the same frequency interval as the current channel. This could be the case where the RSSI measurements of the network node 200 indicate that the current frequency interval is still the best choice for placing the new channel, although the RSSI measurements from the wireless devices 300a, 300b triggers the network node 200 to perform channel reconfiguration.

In further aspects, the new frequency (i.e., the frequency of the new channel) could be selected to have a certain frequency separation to the one or more neighbour frequencies with strong interference detected by the wireless devices 300a, 300b. That is, according to an embodiment the new frequency interval is selected to be distanced to at least one of the at least one further frequency as well as to the current frequency (or even to the current frequency interval). Thereby, if there are wireless devices 300a, 300b reporting high RSSI measurements from one or more neighbor frequencies, the network node 200a will reconfigure the channel based on RSSI measurements made by the network node 200 itself and make sure that the new channel has a safe distance to any neighbouring frequencies with high RSSI as reported by the wireless devices 300a, 300b.

Figure 4:
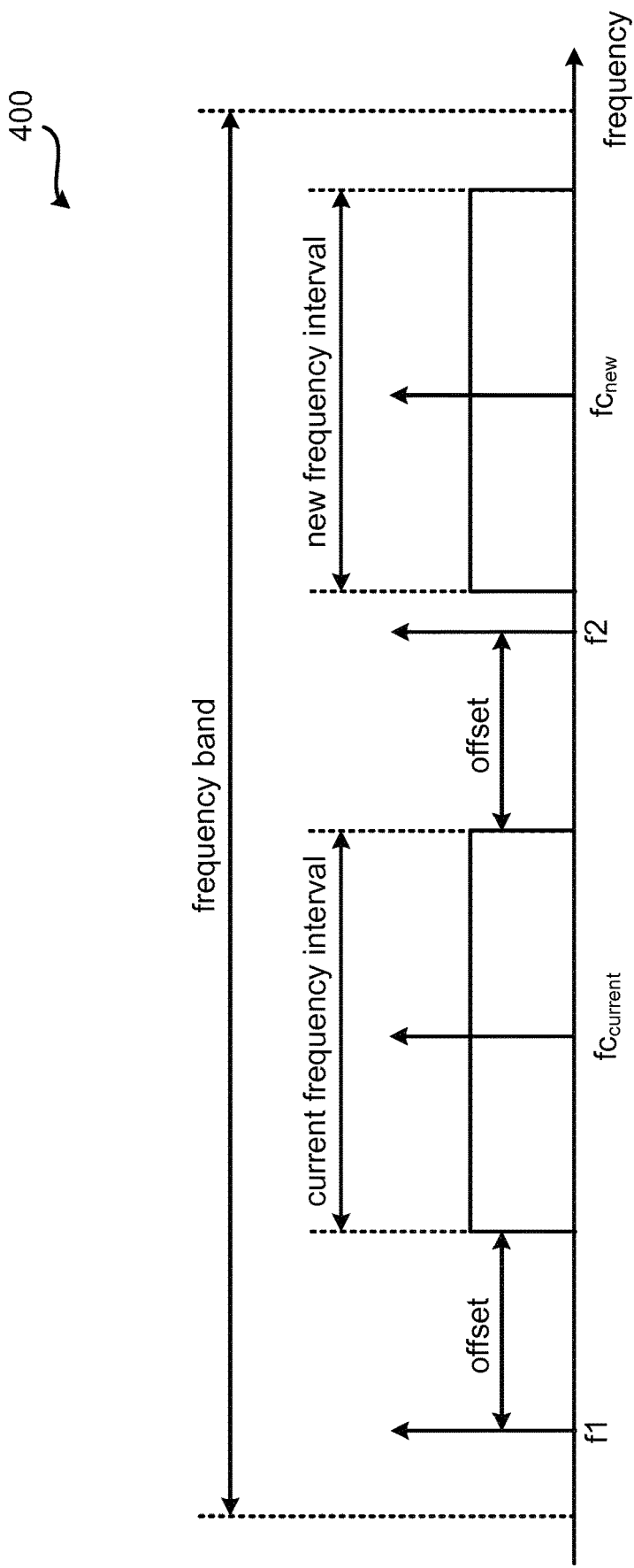
FIG. 4 schematically illustrates a frequency band according to an embodiment.

Intermediate reference is now made to FIG. 4. FIG. 4 schematically illustrates a frequency band 400 along a frequency axis. Within the frequency band is located a current frequency interval and a new frequency interval. A current channel is located at a current frequency (denoted $fc_{current}$) within the current frequency interval and a new channel is located at a new frequency (denoted $fc_{new}$) within the new frequency interval. Two neighbouring frequencies located at an offset to the current frequency interval are denoted f1 and f2. According to the illustrative example of FIG. 4, the new frequency interval is located such that it does not contain any of the neighbouring frequencies f1, f2.

In general terms, as disclosed above, the channel reselection is mainly based on RSSI measurement performed by the network node 200. According to an embodiment the RSSI measurements performed by the network node 200 are performed prior to being triggered to perform channel reconfiguration. Such RSSI measurements represent historical RSSI measurements. According to another embodiment the RSSI measurements performed by the network node 200 are performed in response to being triggered to perform channel reconfiguration. Such RSSI measurements represent new RSSI measurements. In this respect, if historical RSSI measurements as performed by network node 200 are not available, the network node 200 thus needs to schedule RSSI measurement within a proper frequency range. When there are historical RSSI measurements available, the network node 200 could select the new channel according to the historical RSSI measurements, thus avoiding the scheduling of new RSSI measurements.

Reference is now made to FIG. 5 illustrating methods for channel reconfiguration in a communications network 100 as performed by the network node 200 according to further embodiments. It is assumed that steps S102 and S104 are performed as described above with reference to FIG. 3 and a thus repeated description thereof is therefore omitted.

In some aspects the network node 200 needs permission from the SAS to use the new channel. The network node 200 might therefore need to request access from the SAS. Hence, according to an embodiment the network node 200 is configured to perform step S106:

S106: The network node 200 requests, from the SAS, access to use the new channel.

If a grant of the access is not received from the SAS the network node 200 could select another new channel, wherein this another new channel is selected in the same way as the originally selected new channel, but with the condition, or side constraint, that this another new channel must be different from the originally selected new channel.

Further, the network node 200 might need to inform the wireless devices 300a, 300b of the new channel so that the wireless devices 300a, 300c can shift to the new channel in order to be served by the network node 200. Hence, according to an embodiment the network node 200 is configured to perform step S108:

S108: The network node 200 notifies the wireless devices 300a, 300b of the new channel in order to serve the wireless devices 300a, 300b in the new channel.

There could be different types, or examples, of frequency bands within which the current frequency interval and the new frequency interval are located. In some aspects the frequency band is an unlicensed frequency band. Hence, according to an embodiment the current frequency interval and the new frequency interval are part of an unlicensed frequency band. In some aspects the frequency band is the so-called 3550-3700 MHz frequency band. Hence, according to an embodiment the current frequency interval and the new frequency interval are selected to be located within the frequency band extending from 3550 MHz and 3700 MHz. In some aspects the frequency band is a CBRS frequency band. Hence, according to an embodiment the current frequency interval and the new frequency interval are selected to be located within a CBRS frequency band. According to some aspects, one of the (current) frequency band and the new frequency band is a Citizens Broadband Radio Service, CBRS, frequency band and the other of the (current) frequency band and the new frequency band is, for example, a third generation partnership project, 3GPP, frequency band.

Figure 6:
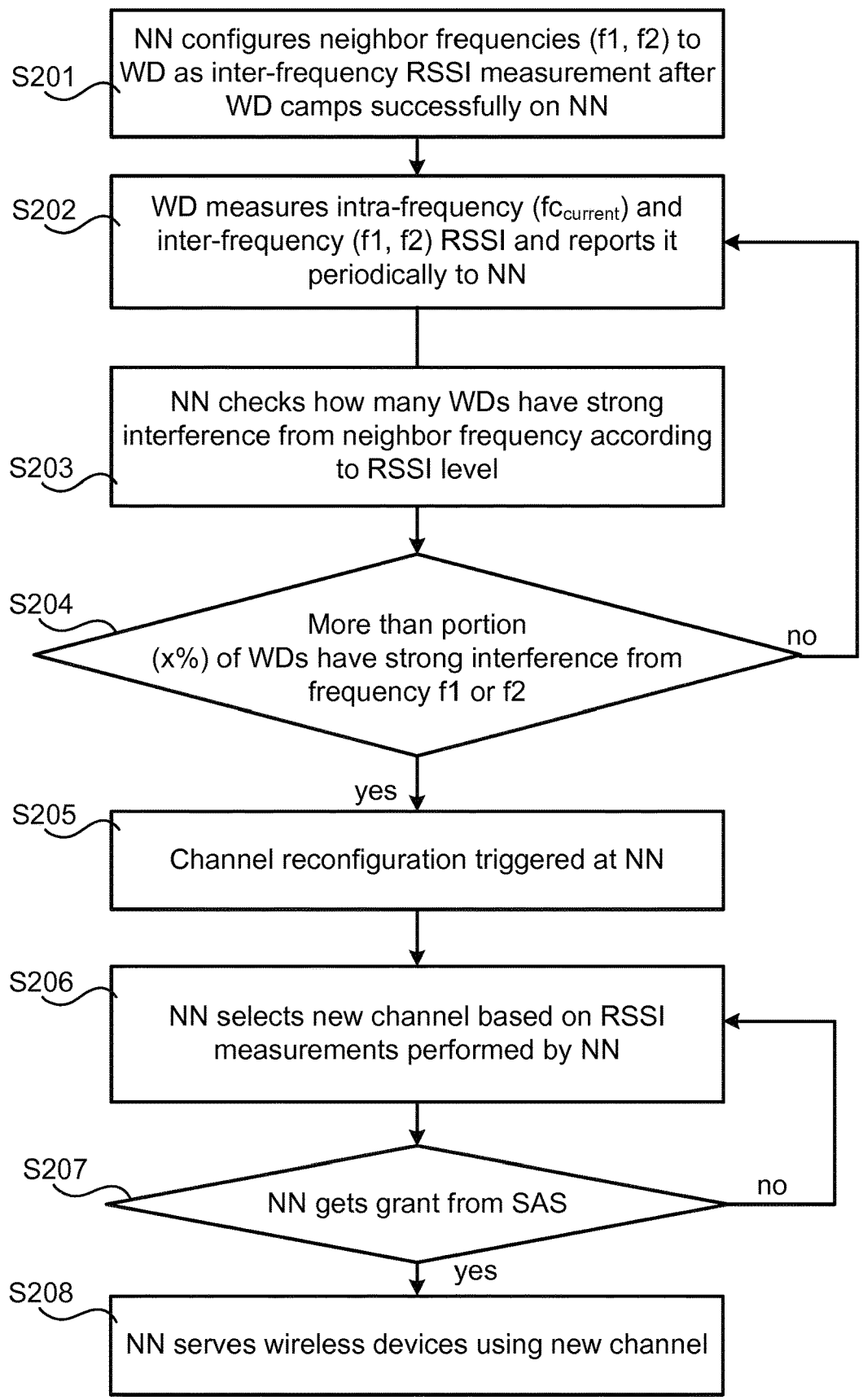

One particular embodiment of channel reconfiguration in a communications network 100 as performed by the network node 200 will now be disclosed with reference to the flowchart of FIG. 6 (where NN is short for the network nodes 200 and WD is short for wireless device 300a, 300b).

S201: The network node 200 configures wireless device 300a, 300b that successfully camp on the network node 200 to perform RSSI measurements at neighbouring frequencies f1, f2.

S202: The wireless devices 300a, 300b perform RSSI measurements at the frequency $fc_{current}$ of the current channel neighbouring frequencies f1, f2 and report these RSSI measurements periodically to the network node 200, which thus obtains the RSSI measurements.

S203: The network node 200 checks how many of the wireless devices 300a, 300b have strong interference from one or more of the neighbor frequencies f1, f2 according to the RSSI measurements.

S204: The network node 200 checks if more than a certain portion of the wireless devices 300a, 300b have strong interference from one or more of the neighbor frequencies f1, f2 according to the RSSI measurements. If no, step S202 is entered again. If yes, step S205 is entered.

S205: The RSSI measurements as performed by the wireless devices 300a, 300b trigger channel reconfiguration to be made by the network node 200.

S206: The network node 200 selects a new channel based on RSSI measurements performed by the network node 200 in accordance with what has been disclosed above. These RSSI measurements are either historical RSSI measurements or new RSSI measurements.

S207: The network node 200 requests, from the SAS, access to use the new channel. If a grant of the access is not received, step S206 is entered again for the network node

200 to select another new channel. If a grant of the access is received, step S208 is entered.

S208: The network node 200 notifies the wireless devices 300a, 300b of the new channel and serves the wireless devices 300a, 300b in the new channel.

Figure 7:
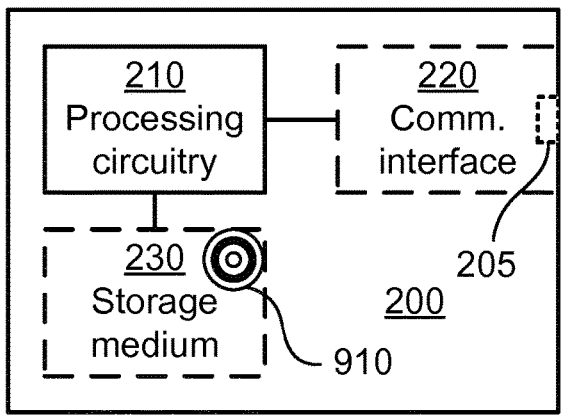
FIG. 7 is a schematic diagram showing functional units of a network node according to an embodiment.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S108, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, nodes, and devices, such as the wireless devices 300a, 300b and the spectrum access system, in the communications network 100. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 8:
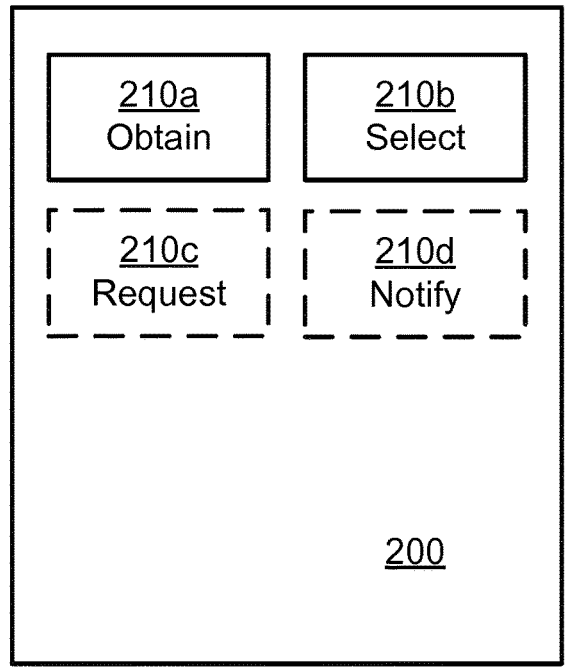
FIG. 8 is a schematic diagram showing functional modules of a network node according to an embodiment.

FIG. 8 schematically illustrates, in terms of a number of functional modules, the components of a network node 200 according to an embodiment. The network node 200 of FIG. 8 comprises a number of functional modules; an obtain module 210a configured to perform step S102 and a select module 210b configured to perform step S104. The network node 200 of FIG. 8 may further comprise a number of optional functional modules, such as any of a request module 210C configured to perform step S106, and a notify module 210d configured to perform step S108. In general terms, each functional module 210a-210d may in one embodiment be implemented only in hardware and in another embodiment with the help of software, i.e., the latter embodiment having computer program instructions stored on the storage medium 230 which when run on the processing circuitry 210 makes the network node 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The network node 200 may be provided as a standalone device or as a part of at least one further device. As disclosed above, the network node 200 could be a CBSD. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 7 the processing circuitry 210 may be distributed among a plurality of devices, or nodes. The same applies to the functional modules 210a-210d of FIG. 8 and the computer program 920 of FIG. 9 (see below).

Figure 9:
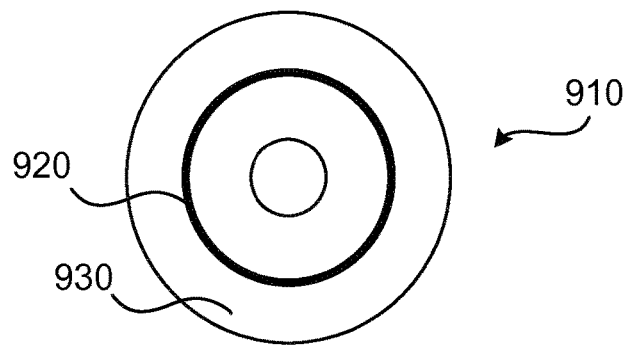
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a compact disc (CD) or a digital versatile disc (DVD) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a Universal Serial Bus (USB) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for channel reconfiguration in a communications network, the method being performed by a network node, the method comprising:
obtaining received signal strength indicator (RSSI) measurements from wireless devices, the wireless devices being served by the network node at a current channel in a current frequency interval within a frequency band, the RSSI measurements triggering a need for the network node to perform channel reconfiguration; and
selecting a new channel in a new or the same frequency interval, in a new or the same frequency band, for serving the wireless devices by the network node based on RSSI measurements performed by the network node, thereby performing the channel reconfiguration.

2. The method according to claim 1, wherein the current channel is located at a current frequency, wherein the RSSI measurements from the wireless devices comprise RSSI measurements performed at the current frequency as well as at at least one further frequency, the at least one further frequency being located at a frequency offset to the current frequency.

3. The method according to claim 2, wherein the channel reconfiguration is triggered when the RSSI measurements performed at the at least one further frequency indicate high interference.

4. The method according to claim 2, wherein the channel reconfiguration is triggered when a difference between the RSSI measurements performed at the current frequency and the RSSI measurements performed at the at least one further frequency is smaller than a threshold value for at least a portion of the wireless devices.

5. The method according to claim 2, wherein the new frequency interval is selected to be distanced to at least one of the at least one further frequency, as well as to the current frequency.

6. The method according to claim 1, wherein the channel reconfiguration is triggered when the RSSI measurements from at least a portion of all wireless devices from which RSSI measurements are received indicate high interference.

7. The method according to claim 1, wherein the channel reconfiguration is triggered when the RSSI measurements from at least a portion of wireless devices with a high UE category, from which RSSI measurements are received indicate high interference.

8. The method according to claim 1, wherein the RSSI measurements performed by the network node are performed prior to being triggered to perform channel reconfiguration.

9. The method according to claim 1, wherein the RSSI measurements performed by the network node are performed in response to being triggered to perform channel reconfiguration.

10. The method according to claim 1, further comprising:
requesting, from a spectrum access system (SAS) access to use the new channel.

11. The method according to claim 1, further comprising:
notifying the wireless devices of the new channel, in order to serve the wireless devices in the new channel.

12. The method according to claim 1, wherein the current channel is located at a current frequency in the current frequency interval and the new channel is located at a new frequency in the new frequency interval.

13. The method according to claim 12, wherein the new frequency interval is selected such that the new frequency is located outside the current frequency interval.

14. The method according to claim 1, wherein the current frequency interval and the new frequency interval are part of an unlicensed frequency band.

15. The method according to claim 1, wherein the current frequency interval and the new frequency interval are selected to be located within the frequency band extending from 3550 MHz and 3700 MHz.

16. The method according to claim 1, wherein the current frequency interval and the new frequency interval are selected to be located within a Citizens Broadband Radio Service (CBRS) frequency band.

17. The method according to claim 1, wherein one of the frequency band and the new frequency band is a Citizens Broadband Radio Service (CBRS) frequency band and the other of the frequency band and the new frequency band is a third generation partnership project (3GPP) frequency band.

18. The method according to claim 1, wherein the network node is a Citizens Broadband Radio Service Device (CBSD).

19. A network node for channel reconfiguration in a communications network, the network node comprising processing circuitry, the processing circuitry being configured to cause the network node to:
obtain received signal strength indicator (RSSI) measurements from wireless devices, the wireless devices being served by the network node at a current channel in a current frequency interval within a frequency band, the RSSI measurements triggering a need for the network node to perform channel reconfiguration; and
select a new channel in a new or the same frequency interval, in a new or the same frequency band, for serving the wireless devices by the network node based on RSSI measurements performed by the network node, thereby performing the channel reconfiguration.

20. A network node for channel reconfiguration in a communications network, the network node comprising:
processing circuitry; and
a storage medium storing instructions that, when executed by the processing circuitry, cause the network node to:
obtain received signal strength indicator (RSSI) measurements from wireless devices, the wireless devices being served by the network node at a current channel in a current frequency interval within a frequency band, the RSSI measurements triggering a need for the network node to perform channel reconfiguration; and
select a new channel in a new or the same frequency interval, in a new or the same frequency band, for serving the wireless devices by the network node based on RSSI measurements performed by the network node, thereby performing the channel reconfiguration.

21. The network node according to claim 20, wherein the network node is a Citizens Broadband Radio Service Device (CBSD).

22. A network node for channel reconfiguration in a communications network, the network node comprising:
an obtain module configured to obtain received signal strength indicator (RSSI) measurements from wireless devices, the wireless devices being served by the network node at a current channel in a current frequency interval within a frequency band, the RSSI measurements triggering a need for the network node to perform channel reconfiguration; and
a select module configured to select a new channel in a new or the same frequency interval, in a new or the same frequency band, for serving the wireless devices by the network node based on RSSI measurements performed by the network node, thereby performing the channel reconfiguration.

* * * * *